United States Patent

Kerkar

Patent Number: 5,279,994
Date of Patent: Jan. 18, 1994

[54] AQUEOUS PROCESSING OF GREEN CERAMIC TAPES

[75] Inventor: Awdhoot V. Kerkar, Columbia, Md.

[73] Assignee: W. R. Grace & Co.-Conn., New York, N.Y.

[21] Appl. No.: 16,333

[22] Filed: Feb. 11, 1993

[51] Int. Cl.$^5$ ............................................. C04B 35/64
[52] U.S. Cl. ........................................ 501/94; 501/127; 501/128; 501/96; 264/63
[58] Field of Search .................... 501/94, 96, 102, 127, 501/128; 264/63, 212

[56] References Cited

U.S. PATENT DOCUMENTS

| | | | |
|---|---|---|---|
| 4,025,462 | 5/1977 | Cleveland | 252/477 R |
| 5,086,093 | 2/1992 | Miller | 524/28 |
| 5,225,126 | 7/1993 | Alles et al. | 264/63 |

*Primary Examiner*—Karl Group
*Assistant Examiner*—Chris Gallo
*Attorney, Agent, or Firm*—Steven Capella

[57] ABSTRACT

A proteinaceous gelatin binder is used to make aqueous green ceramic compositions suitable for forming green ceramic tape by tape casting. Any known ceramic may be used. The tapes may be fired individual or as a laminate to produce sintered ceramic articles.

20 Claims, No Drawings

AQUEOUS PROCESSING OF GREEN CERAMIC TAPES

BACKGROUND OF THE INVENTION

In the manufacture of many ceramic products, a ceramic powder is combined with a binder and a carrier medium such as a solvent, and the combination is formed into a green ceramic tape. The green ceramic tape may be subjected to processing steps such as cutting, lamination, hole punching, and metallization. After such processing steps (if any), the tape or tape laminate is fired to produce a sintered ceramic body.

While green ceramic tapes can be formed by several techniques, the most widely used technique is tape casting. In tape casting, a ceramic powder/binder/carrier medium formulation is cast onto a backing sheet. The sheet, with the green ceramic formulation on its surface, is then passed under a device such as a "doctor" blade which regulates the thickness of the ceramic tape.

In order for the green ceramic formulation to be workable during the tape casting process, a solvent is typically added to the formulation as the carrier medium. For most binders, an organic solvent is used. In recent years, however, the use of organic solvents has become less desirable due to environmental problems associated with their later removal from the tape.

Some binder systems which use water as the solvent or carrier medium have been developed. Examples of some aqueous systems are shown in U.S. Pat. No. 5,086,093. These binder systems are often expensive and require a relatively high proportion of binder compared to the amount of ceramic powder in the formulation. The higher amount of binder results in a lower density green tape which requires more severe firing conditions to densify and which undergoes a greater amount of shrinkage on densification. Many aqueous systems also require lengthy times for drying the tape. These disadvantages have discouraged the adoption of such water-based systems for tape casting.

SUMMARY OF THE INVENTION

The invention provides compositions for water-based tape casting of green ceramic tape which overcome these disadvantages. The tape casting compositions of the invention use a proteinaceous gelatin binder. These compositions are able to form strong, flexible cast tape using relatively low amounts of binder. The gelatin-containing tapes have further advantage of low cost. Additionally, the water solvent can be rapidly removed without degrading the tape. The gelatin binder system of the invention further allows recycle of scrap tape by simple dissolution of the gelatin binder.

The invention encompasses a water-based composition suitable forming green ceramic tape by tape casting, the composition consisting essentially of
 a) ceramic powder,
 b) a proteinaceous gelatin binder,
 c) a plasticizer, and
 d) water.

The compositions may contain other additives such as defoaming agents, dispersants, pH-adjusting agents, etc. The gelatin binder is preferably an animal-derived gelatin. Preferably, the gelatin is present at about 1-10 wt. % based on the weight of ceramic powder. The invention also encompasses green ceramic tape formed from these compositions.

The invention further encompasses methods of forming green ceramic tape and ceramic articles using the tape casting compositions of the invention. The method of forming a green ceramic tape comprises:
 a) combining water, ceramic powder, and plasticizer to form a slurry,
 b) heating the slurry and adding gelatin whereby said gelatin is dissolved to form a modified slurry,
 c) casting the modified slurry onto a backing sheet,
 d) cooling the cast slurry whereby the binder gels to form the green ceramic tape, and
 (e) drying said tape.

Alternatively, the gelatin may be added to the slurry before heating step b). The casting may be accomplished by casting onto the support sheet and running the sheet under a doctor blade. Alternatively, the slurry can be cast by pouring the slurry between two sheets which are passed through closely spaced rollers. Other additives such as dispersants, defoaming agents, etc. may also be added in step a).

The tape may be cooled by refrigeration, by exposure to ambient temperature or other technique. The tape is preferably dried and subsequently peeled from the backing sheet. The tape may be fired singly or laminated with other green ceramic tapes before firing to form a dense ceramic body.

DETAILED DESCRIPTION OF THE INVENTION

The aqueous green ceramic compositions of the invention are characterized by the use of proteinaceous gelatin binder. These aqueous compositions are especially useful for forming flexible green ceramic tape by tape casting.

The green ceramic compositions of the invention generally contain
 a) ceramic powder,
 b) a proteinaceous gelatin binder,
 c) a plasticizer, and
 d) water.

Preferably, the green ceramic compositions consist essentially of components a-d above. The compositions may also contain other additives as discussed below.

The ceramic powder may be any known ceramic material or combination of ceramic materials. Preferably, the ceramic powder is a sinterable powder. The ceramic powder may also include a sintering aid(s). Examples of ceramic powders are alumina, zirconia, titania, mullite, silicon nitride, silica, zirconium aluminum titanate and mixtures thereof. The particle size of the ceramic powder may be of any particle size distribution known to be suitable for tape casting and/or sintering.

The proteinaceous gelatin binder may be any known proteinaceous gelatin binder. Most proteinaceous gelatins are obtained by selective hydrolysis of collagen (typically obtained from the white connective tissue of animal skins and bones). Kirk-Othmer Encyclopedia of Chemical Technology, 2nd Ed., vol. 10, page 499 provides a detailed discussion on proteinaceous gelatin. Proteinaceous gelatin should not be confused with other gelling substances such as those derived from seaweed (e.g. agar, carrageenan, etc.) which are polysaccharides. Preferably, proteinaceous gelatin is the only binder used in the formulation. It may be possible to add minor amounts of other compatible binders as long as they do not materially affect the properties of the proteinaceous gelatin. The amount of gelatin in the green ceramic composition is preferably about 1–10 wt. % based on the weight of the ceramic powder.

The plasticizer may be any known plasticizer which is compatible with the gelatin binder. Polyols such as glycerol are preferred plasticizers. The amount of plasticizer in the composition is preferably about 70–100 wt. % based on the weight of the gelatin binder.

The water may be from any suitable source. The water preferably does not contain any impurities which might substantially interfere with the gelling of the proteinaceous gelatin binder. Deionized water is preferred. A pH adjusting agent may be added to the water to change its pH to improve dispersion of the ceramic powder. The optimal pH may depend on the ceramic powder and/or the dispersant used (if any). In some cases, it may be possible to omit the dispersant. For example, if the pH is made acidic ($\sim 3.0$), alumina particles can be dispersed without a dispersant.

The amount of water used in the compositions for tape casting is preferably about 20–40 wt. % based on the total weight of the composition. Since the green ceramic tapes are typically dried after casting, the actual green tapes which are processed to form ceramic articles would have a much lower water content than the composition prior to casting.

The green ceramic compositions may additionally contain minor amounts of known processing expedients such as dispersants and defoaming agents. A preferred dispersant is Darvan ® 821-A sold by R. T. Vanderbilt Co. A preferred defoaming agent is XF-B41-52 sold by Air Products Co. The amount of dispersant and defoaming agent are preferably about 1–5 wt. % and 0.05–0.5 wt. % respectively based on the weight of the ceramic powder.

The green ceramic tapes using the tape casting composition of the invention may be made by a) combining water, ceramic powder and plasticizer to form a slurry, b) heating the slurry and adding proteinaceous gelatin binder whereby the gelatin binder is dissolved to form a modified slurry, c) casting the modified slurry onto a backing sheet, d) cooling the cast slurry whereby the gelatin binder gels to form the tape, and e) drying the tape to strengthen the green ceramic tape.

The green ceramic tape would typically be removed from the backing sheet so the tape could be fired to form a dense ceramic article. Removal of the backing sheet may be optional if the sheet is easily destroyed during the firing. The tape can be fired alone or as part of a laminate of green tapes to form a thicker article. The tape may be cut into a desired two dimensional shape before firing. Holes or slots may also be formed in the tape before firing.

In forming the initial slurry, it is generally preferable that the pH of the water be adjusted to suit the dispersant, if one is used. For dispersant, Darvan ® 821-A, the water has a pH of about 8–10, more preferably about 9. The pH can be adjusted to this range by addition of a minor amount of a suitable base such as 0.1N NaOH.

While the ingredients may be combined in any order, it is generally preferred that the pH of the water be adjusted first. Then, a dispersant (if used) should be added. The ceramic powder is then added to the solution to form a slurry. The slurry is preferably mixed to disperse the ceramic powder. Any conventional mixing technique may be used, but a blender is generally preferred. The plasticizer and defoaming agent (if used) are then preferably added to the slurry. The slurry is then preferably heated to about 70°–80° C. The gelatin binder is then added and dissolved in the heated slurry. Preferably, the mixing is maintained to assist in dissolving the gelatin. If desired, the gelatin may be added to the slurry before the heating step. The heated slurry may optionally be de-aired by exposing the slurry to vacuum for about 5–10 minutes.

The slurry is then cast onto a backing sheet. Any suitable backing sheet may be used. Mylar ® cellulose acetate is a preferred backing sheet material. The casting may be performed by any known tape casting technique. Preferred methods of casting are conventional "doctor" blade tape casting and roller (tape) casting.

In conventional tape casting, the green ceramic composition (slurry) is poured onto a backing sheet which is typically supported by a flat plate. The backing sheet and slurry are then passed under a doctor blade set at a height above the sheet corresponding to the desired tape thickness. The resulting tape is then dried (preferably in air for about 6–10 hours) to increase its strength and decrease tackiness. The gelatin binder sets during the casting and drying as it cools to ambient (room) temperature. If quicker setting is desired, the tape can be exposed to temperatures below the ambient temperature by refrigeration.

In roller (tape) casting, two backing sheets are passed between two cylindrical rollers which are spaced at a desired distance corresponding to the thickness of tape desired. The green ceramic slurry is then poured between the backing sheets such that a backing sheet-slurry-backing sheet "sandwich" is squeezed through the space between the rollers. The resulting tape is then preferably cooled by refrigeration to set the gelatin binder. After setting, one of the backing sheets can be removed. The tape is then preferably dried in air for about 6–10 hours.

The dried tape from either method is then preferably peeled from the backing sheet. The dried tape preferably has a thickness of about 1–100 mils (25–2500 μm). In some instances, the tape may be fired without removing the backing sheet depending on the specific backing sheet material and firing conditions. The tape may be subjected to any conventional tape processing technique such as cutting or hole punching to achieve a desired two dimensional shape. The tapes may be fired individually or they may be laminated together to produce an article of greater thickness. The lamination may be performed by warm or cold pressing. If warm pressing is used, the pressing temperature is preferably about 80° C. or less.

The tape compositions of the invention have a unique advantage in that the scraps from cutting can be dissolved by heating and adding water. The dissolved scraps can then be recast into tapes.

The tape or tape laminate may then be fired to form a dense ceramic part. Preferably, the firing is done in an oxygen-containing atmosphere such as air. The firing time and temperature may vary depending on the specific ceramic material being fired. Preferably, the firing results in a ceramic article of at least 95% of theoretical density, more preferably at least about 98% of theoretical density.

The following examples are presented to further illustrate aspects of the invention. The invention is not limited to the specific details of the examples.

EXAMPLE 1

The pH of 90 g of deionized water was adjusted to 9 by adding 0.1N NaOH. 6.3 g of Darvan ® 821-A was added as a dispersant. 210 g of tetragonal zirconia powder was added to the solution. The slurry was milled for 1 hour using tetragonal zirconia milling media. 10.5 g of glycerol was added as a plasticizer. 1 g of XF-B41-52 defoaming agent was added to the slurry. The slurry was strained to separate the milling media. The slurry was heated to 80° C. on a hot plate. 10.5 g of proteinaceous gelatin was added to the slurry with stirring until the gelatin dissolved completely. The slurry was then deaired in vacuum for 5 minutes and cast into a 50 mil thick tape on a Mylar ® sheet supported on a glass plate using a doctor blade. The tape was dried in air for 10 hours before it was peeled off the from the Mylar ® sheet. The thickness of the dried tape was approximately 25 mils.

EXAMPLE 2

To 30 g of deionized water, 0.1N NaOH was added to adjust the pH to 9. 2.1 g of Darvan ® 821-A was added as a dispersant. 70 g of A-16 alumina powder (Alcoa) was added to the solution to make the slurry. The slurry was milled for 1 hour using alumina milling media. 3.5 g of glycerol was added as a plasticizer and 0.1 g of XF-B41-52 was added as a defoamer to the slurry. The slurry was heated to 80° C. on a hot plate. 3.5 g of proteinaceous gelatin was then added as the binder. Following the procedure described in example 1 above, a tape was cast using the doctor blade.

EXAMPLE 3

As an alternative to conventional tape casting, the slurry described in example 1 above was poured in the nip (space) formed between two Mylar ® sheets fed into two counter-rotating rollers. The nip size between the roller was adjusted using the adjustment screws on the machine. The slurry was sandwiched in between the two Mylar ® sheets and squeezed into a tape as it passed through the rollers. The sandwiched tape was allowed to cool in a refrigerator before one of the Mylar sheets was peeled off from the tape. The tape was allowed to dry for 6 hours before it was peeled from the supporting Mylar sheet. The dried thickness was about 4 mils.

EXAMPLE 4

Discs, rectangular strips, circular washers were cut (or punched) out from the tape from example 3. 8 pieces of the tape were stacked in a stainless steel die and pressed at 14,000 psi in a uniaxial hand-press. Pressed discs, rectangular bars, and washers were fired in air at 1500° C. for 2 hours. Sintered density on the fired zirconia parts was measured to be 98% of theoretical. Average 3-point flexure strength of the bars was measured to be approximately 117,000 psi. No gross delaminations were observed in the sintered microstructure.

What is claimed is:

1. A water-based composition suitable forming green ceramic tape by tape casting, said composition consisting essentially of
   a) ceramic powder,
   b) a proteinaceous gelatin binder,
   c) a plasticizer, and
   d) water.
2. The composition of claim 1 wherein said gelatin is derived from collagen.
3. The composition of claim 2 wherein the amount of gelatin in the composition is about 1–10 wt. % based on the weight of said ceramic powder.
4. The composition of claim 3 wherein about 5 wt. % of said gelatin is present.
5. The composition of claim 1 wherein the composition contains a defoaming agent and a dispersant.
6. The composition of claim 2 wherein said plasticizer is glycerol.
7. The composition of claim 1 wherein said plasticizer is present in an amount of about 70–100 wt. % based on the weight of said gelatin.
8. The composition of claim 1 wherein said ceramic powder includes ceramic powder selected from the group consisting of alumina, zirconia, titania, mullite, silica, silicon nitride, zirconium aluminum titanate, and mixtures thereof.
9. The composition of claim 1 wherein said ceramic powder forms at least about 60 wt. % of the total composition.
10. A green ceramic tape consisting essentially of
    a) ceramic powder,
    b) a proteinaceous gelatin binder, and
    c) a plasticizer.
11. The tape of claim 10 wherein the amount of said binder is about 1–10 wt. % based on the weight of said ceramic powder.
12. The tape of claim 11 consisting essentially of about 100 parts by weight ceramic powder, about 5 parts by weight gelatin binder, and about 5 parts by weight plasticizer.
13. A method of forming a green ceramic tape, said method comprising:
    a) combining water, ceramic powder, plasticizer to form a slurry,
    b) heating said slurry and adding proteinaceous gelatin to said slurry whereby said gelatin is dissolved to form a modified slurry,
    c) casting said modified slurry onto a backing sheet,
    d) cooling said cast slurry whereby said binder gels to form said tape, and
    e) drying said tape.
14. The method of claim 13 further comprising
    f) peeling said dried tape from said backing sheet.
15. The method of claim 13 wherein said modified slurry formed in step b) contains about 1–10 wt. % gelatin based on the weight of said ceramic powder.
16. The method of claim 13 wherein said cooling step d) comprises refrigerating said cast slurry.
17. The method of claim 13 wherein the slurry is cast between two support sheets in step c).
18. The method of claim 13 wherein the tape of step d) is shaped by cutting said tape.
19. The tape of claim 8 wherein said ceramic powder additionally includes a sintering aid.
20. The tape of claim 10 having a thickness of about 1–100 mils.

* * * * *